Jan. 24, 1961 N. C. LUDWIG 2,969,227
APPARATUS FOR MAKING PELLETS
Filed Dec. 29, 1958
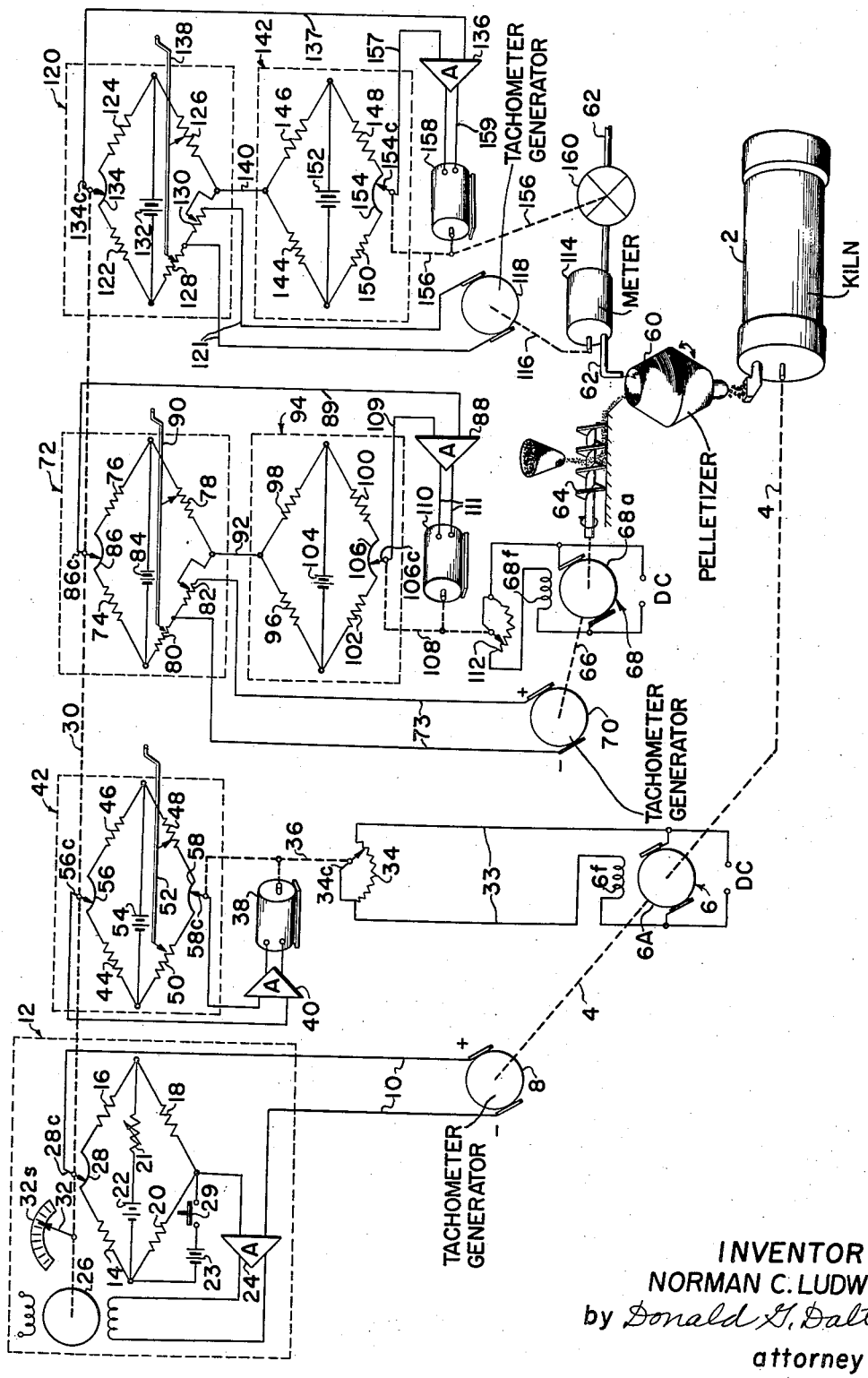
INVENTOR
NORMAN C. LUDWIG
by Donald G. Dalton
attorney United States Patent Office 2,969,227
Patented Jan. 24, 1961

2,969,227

APPARATUS FOR MAKING PELLETS

Norman C. Ludwig, Chicago, Ill., assignor to United States Steel Corporation, a corporation of New Jersey Filed Dec. 29, 1958, Ser. No. 783,436

4 Claims. (Cl. 263—33)

This invention relates to apparatus for controlling the rate of flow of several ingredients into a process and more particularly to the control of the rates of flow of raw cement meal and water into a pelletizer which supplies pellets to a cement kiln. Although my invention has particular application in the cement making industry it is generally useful in controlling one or more variables the values of which depend upon the value of an independent variable. In the cement making industry it has been found that by supplying the raw materials to certain types of kilns in pellet form a more efficient process and a more consistent product results. In order to eliminate the need for pellet storage facilities it is desirable to produce only as many pellets as are immediately required by the kiln. A common practice employed in the operation of a rotary kiln is to use a constant firing rate and adjust the cement meal feed rate and speed of rotation of kiln to maintain a proper burning temperature. These latter two rates are usually linked together by electrical means, so the adjustment of the feed rate automatically proportionally adjusts the kiln speed rate. Hence, at a constant firing rate, the quantity of pellets required by the kiln depend upon the speed of rotation of the kiln and the rate of pellet production must be made to depend upon this speed. The speed of the kiln is usually controlled manually by the burnerman. Since the rate of pellet output of the pelletizer is dependent upon the rate at which the raw materials are fed into the pelletizer, the output rate may be regulated by the regulation of the rates of flow of the raw cement meal and water into the pelletizer. My invention provides an apparatus for so controlling these input rates so that these rates depend upon the kiln speed. To obtain a consistent product the ratio of water to raw cement meal supplied to the pelletizer must be maintained constant over the total range of speeds at which the system operates.

It is therefore an object of my invention to provide a pelletizer in which the rate of feed of solids and water is maintained proportional to an independent variable.

Another object is to provide cement making apparatus in which the rates of flow of raw cement meal and water into a pelletizer are made proportional to the speed of a rotary cement kiln which is being supplied with pellets from the pelletizer.

These and other obejcts will become more apparent after referring to the following specification and attached drawing, in which:

The single figure is a schematic view of a system for controlling the rates of flow of ingredients supplied through a pelletizer to a cement kiln.

Referring more particularly to the drawing, reference numeral 2 indicates a rotary cement kiln which is driven through a shaft 4 by the D.C. motor 6 having an armature 6A and a field 6F. Also attached to the shaft 4 is a tachometer generator 8, the voltage output of which is connected through wires 10 to a conventional automatically balanced potentiometer 12. The potentiometer 12 includes resistors 14, 16, 18 and 20, adjustable resistance 21, battery 22, standard cell 23, chopper amplifier 24, balancing motor 26, slidewire 28, slidewire contactor 28C, switch 29, shaft 30 driven by motor 26, indicating pointer 32 attached to shaft 30, and scale 32S. The contactor 28C is also mechanically connected to shaft 30.

Connected to field 6F of motor 6 by means of wires 33 is a rheostat 34 with a moving contactor 34C. The contactor 34C is attached to a shaft 36 which is positioned by a drive unit 38. The drive unit 38 is an electromechanical transducer which is driven by a voltage from chopper amplifier 40. The input to chopper amplifier 40 is the voltage unbalance of a bridge 42. The bridge 42 includes fixed resistors 44 and 46, variable resistors 48 and 50, the contact arms of which are attached to a shaft 52, battery 54, slidewire 56, slidewire contactor 56C, slidewire 58, and slidewire contactor 58C. Contactor 56C is mechanically attached to the shaft 30 and electrically connected to the chopper amplifier 40. Slidewire contactor 58C is mechanically attached to the shaft 36 and electrically connected to the amplifier 40.

Raw materials are supplied to kiln 2 in pellet form from pelletizer 60. These pellets consist of water which is supplied to the pelletizer 60 through pipe 62 and raw cement meal in fine powder form which is supplied to the pelletizer 60 by a conveyor screw 64. Conveyor screw 64 and its associated equipment are such that the rate of flow of raw cement through the screw is proportional to the speed of rotation of the screw. The conveyor screw 64 is driven through a shaft 66 by a D.C. motor 68 having an armature 68A and a field 68F. Attached to shaft 66 is a tachometer generator 70 to the voltage output of which is applied to a bridge 72 by means of wires 73. The bridge 72 includes fixed resistors 74 and 76, variable resistors 78, 80 and 82, battery 84, slidewire 86, and slidewire contactor 86C. Slidewire contactor 86C is mechanically attached to the shaft 30 and is electrically connected to a chopper amplifier 88 by means of wire 89. The contact arms of variable resistors 78 and 80 are attached to a shaft 90. Bridge 72 is connected by a wire 92 to a bridge 94 which includes fixed resistors 96, 98, 100 and 102, battery 104, slidewire 106 and slidewire contactor 106C. Slidewire contactor 106C is mechanically attached to a shaft 108 and electrically connected to the chopper amplifier 88 by means of wire 109. The output of chopper amplifier 88 is connected to drive unit 110, an electromechanical transducer which drives shaft 108, by means of wires 111. Attached to the shaft 108, in addition to slidewire contactor 106C, is a field rheostat 112 which is connected to the field 68F of motor 68.

The rate of water flow through pipe 62 is measured by a commercial positive displacement rate of flow meter 114. A shaft 116 is driven by water meter 114 at a speed proportional to the rate of water flow through the meter 114. Attached to the shaft 116 is a tachometer generator 118, the voltage output of which is connected to a bridge 120 by means of wires 121. Bridge 120 includes fixed resistors 122 and 124, variable resistors 126, 128 and 130, battery 132, slidewire 134 and slidewire contactor 134C. Slidewire contactor 134C is mechanically attached to the shaft 30 and is electrically connected to a chopper amplifier 136 by means of wire 137. The contact arms of variable resistors 126 and 128 are attached to a shaft 138. Bridge 120 is connected through wire 140 to a bridge 142 which includes fixed resistors 144, 146, 148 and 150, battery 152, slidewire 154 and slidewire contactor 154C. Slidewire contactor 154C is mechanically attached to a shaft 156 and electrically connected to the chopper amplifier 136 by means of wire 157. The output of chopper amplifier 136 is connected to drive unit 158, an electromechanical transducer which drives shaft 156, by means of wires 159. Attached to shaft 156, in addition to slidewire contactor 154C, is a valve 160 which controls the flow of water through pipe 62. This valve 160 must be of a type in which the rate of flow therethrough bears a linear relation to the position of shaft 156.

The operation of my device is as follows: As the motor 6 rotates the kiln 2, the voltage output of tachometer generator 8 is compared with the voltage across the potentiometer 12. If the two voltages are unequal the chopper amplifier 24 receives an input signal and balancing motor 26 is energized. This causes shaft 30 to rotate slidewire contactor 28C until the voltage across potentiometer 12 is equal to the output voltage of tachometer generator 8. At this time motor 26 ceases to rotate shaft 30 because chopper amplifier 24 no longer receives an input signal. Pointer 32 rotates with shaft 30 and therefore scale 32S can be calibrated so that pointer 32 indicates kiln motor speed. Thus it is apparent that the rotational position of shaft 30 is dependent upon the speed of the kiln 2 and because slidewire 56C in bridge 42 is attached to shaft 30 its position on slidewire 56 will be a function of kiln speed. Therefore, bridge 42 and its associated equipment are used to regulate the speed of motor 6 in the following manner: Shaft 52 is adjusted by the operator to vary resistors 48 and 50 so that bridge 42 is balanced when the motor 6 is operating at the desired speed. At this point amplifier 40 receives no input and therefore drive unit 38 does not move rheostat 34 or slidewire contactor 58C. Should the speed of motor 6 vary because of conditions exterior to the control, the variation will be indicated by bridge 12, shaft 30 will turn, slidewire contactor 56C will move on slidewire 56 and amplifier 40 will receive an input. Drive unit 38 responds to the signal from amplifier 40 to move rheostat 34 to bring motor 6 back to the desired speed. When this speed is reached shaft 30 will have turned back to its original position. When the exterior condition is removed the bridge 42 will become unbalanced in the opposite direction due to the change in motor speed, and drive unit 38 will cause rheostat 34 to return to its original setting, thereby bringing motor 6 back to its desired speed. By the same reasoning the system will respond to the operator's adjustment of shaft 52 to change the speed of the kiln motor 6. The operations so far described are performed with conventional apparatus such as an indicating and recording controller sold under the trademark "Speedomax" by Leeds and Northrup Company.

The rate at which pellets are supplied to the kiln 2 should depend upon the speed at which the kiln 2 rotates. Because the output rate of the pelletizer 60 depends upon the rate at which the raw materials are supplied to the pelletizer 60, the rates of flow of raw cement meal and water into the pelletizer 60 are made dependent upon the speed of kiln 2 by use of my invention. The rates of flow of the raw materials into the pelletizer are made linearly proportional to the rotational speed of the kiln 2 so that change in kiln speed will not change the water-solid ratio of the raw material input to the pelletizer 60. However, this ratio may be changed as described hereinafter.

The manner in which the rate of flow of raw cement into pelletizer 60 is controlled will be understood by first assuming that the speed of rotation of the kiln 2 is at a constant desired value and that the rate of flow of raw cement meal into the pelletizer 60 is at a constant desired value. When this condition exists the voltage at slidewire contactor 86C will equal that at slidewire contactor 106C and amplifier 88 will receive no input signal. The voltage across bridge 72 depends upon three factors: (1) the position of the slidewire contactor 86C on slidewire 86, (2) the voltage output of tachometer generator 70 applied across resistor 82, and (3) the setting of shaft 90 to which the moving arms of variable resistors 78 and 80 are attached. The voltage across bridge 94 depends upon the position of the slidewire contactor 106C on the slidewire 106 which position depends upon the setting of drive unit 110. The rate of flow of raw cement meal is set independently by adjustment of shaft 90. This rate of flow of raw cement meal must follow any changes in the speed of the kiln 2. Assume that the operator has increased the speed of the kiln 2 by an adjustment of shaft 52. This change in kiln speed will appear in bridge 72 as a repositioning of the slidewire contactor 86C on slidewire 86 which will cause chopper amplifier 88 to receive an input signal. The output signal from amplifier 88 will cause drive unit 110 to rotate the arm of rheostat 112 and the slidewire contactor 106C. Repositioning of the arm of rheostat 112 will cause motor 68 to speed up. This increased speed causes the output of the tachometer generator 70 to increase which causes the voltage across the bridge 72 to decrease. This change of voltage causes chopper amplifier 88 to receive an input of opposite polarity and therefore drive unit 110 will cause motor 68 to slow down, but not by an amount as great as the earlier speed up. Oscillating movement of slidewire contactor 106C will continue until the output voltage of bridge 94 is equal to that of bridge 72 at which time chopper amplifier 88 no longer receives an input signal so that shaft 108 will stop rotating. At this time the speed of motor 68 (and the rate of flow of raw cement) will have reached its new value for the new kiln speed. In a similar manner, the motor 68 will slow down when the speed of the kiln 2 is decreased.

The arrangement of bridges 120 and 142 is similar to the arrangement of bridges 72 and 94 so that the rate of water flow into the pelletizer 60 is varied in proportion to changes in the speed of the kiln 2 in a manner similar to the rate of raw cement meal flow. The rate of water flow is regulated by valve 160 with water meter 114 and tachometer generator 118 furnishing a signal to bridge 120 proportional to the rate of water flow. Bridge 120 responds to changes in the speed of the kiln 2 due to the fact that slidewire contactor 134C is attached to shaft 30.

For a given set of conditions it is necessary to maintain the water-solids ratio constant. Hence, the speed of motor 68 must be linearly proportional to the angular position of the shaft 108 and the rate of water flow through valve 160 must be linearly proportional to the angular position of shaft 156. The rheostat 112, motor 68 and valve 160 must be chosen to realize this requirement, and such components are available commercially.

Because of changing combustion conditions in the kiln and other factors, it is sometimes necessary to increase or decrease the flow of pellets going into the kiln. Furthermore, because of composition and fineness changes in the raw cement meal, it is sometimes necessary to change the water-solids ratio while all other factors remain constant. It is seen that this required flexibility is accomplished by adjustments on shaft 90, which controls flow of solids independently of kiln speed, and shaft 138, which controls flow of water independently of both kiln speed and flow of solids.

Thus, it is seen that shaft 30 acts as a link between the kiln speed and the rates of flow of raw materials into the pelletizer 60 so that the rate of raw material in pellet form supplied to the kiln 2 will be correct for all kiln speeds. Because both the rate of flow of raw cement and of water into the pelletizer vary linearly with the kiln speed, the ratio between the two will remain constant for all speeds of the kiln 2.

While one embodiment of my invention has been shown and described it will be apparent that other adaptations and modifications may be made without departing from the scope of the following claims.

I claim:

1. Apparatus for making pellets comprising a pelletizer, means for feeding raw solids to said pelletizer, means for obtaining a voltage proportional to rate of feed of raw solids, a rotatable shaft positioned according to the desired output of said pelletizer, a first bridge including a variable resistance having its contactor connected for movement by said shaft, means for connecting the last named voltage to said first bridge, a second bridge, means electrically connecting said first bridge to said second bridge, means for varying the rate of feed of solids, means for connecting the difference in output voltage of said first and second bridges to control said last named means, means for obtaining a voltage proportional to rate of feed of water, a third bridge including a variable resistance having its contactor connected for movement by said shaft, means for connecting the last named voltage to said third bridge, a fourth bridge, means electrically connecting said third bridge to said fourth bridge, means for varying the rate of water feed, and means for connecting the difference in output voltage of said third and fourth bridges to control said last named means.

2. Apparatus for making pellets according to claim 1 including means in said first bridge for adjusting rate of solids flow wtih respect to the output of said pelletizer, and means in said third bridge for adjusting rate of water flow with respect to the output of said pelletizer.

3. Apparatus for making pellets comprising a pelletizer, means for feeding raw solids to said pelletizer, a motor for driving said feeding means, a control field for said motor, a tachometer generator connected to be driven at a speed proportional to the speed of said motor, a rotatable shaft positioned according to the desired output of said pelletizer, a first bridge including a variable resistance having its contactor connected for movement by said shaft, means for connecting the output of said tachometer generator to one leg of said bridge, a second bridge including a variable resistor, means electrically connecting said first bridge to said second bridge, an amplifier electrically connected to said first and second bridges, a drive unit connected to the output of said amplifier, means connecting said drive unit to the contactor of said last named variable resistor, means connecting said drive unit to vary said control field, means for feeding water to said pelletizer, a valve for controlling flow of water, means for obtaining a voltage proportional to rate of feed of water, a third bridge including a variable resistance having its contactor connected for movement by said shaft, means for connecting the last named voltage to one leg of said third bridge, a fourth bridge including a variable resistor, means electrically connecting said third bridge to said fourth bridge, an amplifier electrically connected to said third and fourth bridges, a drive unit connected to the output of said last named amplifier, means connecting said last named drive unit to the contactor of said last named variable resistor, and means connecting said last named drive unit to said valve.

4. Apparatus for making cement comprising a rotating kiln, a motor for rotating said kiln, a tachometer generator connected to be driven at a speed proportional to the speed of said kiln, a first bridge, a balancing motor for controlling a resistance in said bridge, a shaft connected for rotation by said balancing motor, means for applying the difference between the tachometer voltage and the voltage across said bridge to said balancing motor, a second bridge including a variable resistance having its contactor connected for movement by said shaft, means for changing the speed of said kiln motor in response to unbalance of said second bridge, a pelletizer, means for feeding raw cement to said pelletizer, means for feeding water to said pelletizer, means for obtaining a voltage proportional to rate of feed of raw cement, a third bridge including a variable resistance having its contactor connected for movement by said shaft, means for connecting the last named voltage to said third bridge, a fourth bridge, means electrically connecting said third bridge to said fourth bridge, means for varying the rate of feed of raw cement, means connecting the difference in output voltage of said third and fourth bridges to control said last named means, means for obtaining a voltage proportional to rate of feed of water, a filth bridge including a variable resistance having its contactor connected for movement by said shaft, means for connecting the last named voltage to said fifth bridge, a sixth bridge, means electrically connecting said fifth bridge to said sixth bridge, means for varying the rate of water feed, and means connecting the difference in output voltage of said fifth and sixth bridges to control said last named means.

References Cited in the file of this patent

UNITED STATES PATENTS 2,218,390     Alexander _____ Oct. 15, 1940